United States Patent [19]

Miyoshi et al.

[11] Patent Number: 4,682,502
[45] Date of Patent: Jul. 28, 1987

[54] PRESSURE SENSOR

[75] Inventors: Shuji Miyoshi; Masaya Hijikigawa, both of Nara, Japan

[73] Assignee: Sharp Kabushiki Kaisha, Osaka, Japan

[21] Appl. No.: 764,568

[22] Filed: Aug. 12, 1985

[30] Foreign Application Priority Data

Aug. 22, 1984 [JP] Japan ................ 59-175610

[51] Int. Cl.$^4$ ............ G01L 7/06; G01L 7/08; G01L 9/02
[52] U.S. Cl. ................... 73/723; 338/35; 338/41; 338/42
[58] Field of Search ............ 73/725, 719, 717, 723, 73/729, 335; 338/35, 41, 42

[56] References Cited

U.S. PATENT DOCUMENTS 3,820,402  6/1974  Interrante et al. ............ 73/862.58

Primary Examiner—Donald O. Woodiel
Attorney, Agent, or Firm—Spencer & Frank

[57] ABSTRACT

A pressure sensor comprising an air-tight container, enclosing water vapor therein, which elastically deforms depending upon a variation in the external pressure to result in a variation in the content volume thereof, a moisture sensor disposed within the container, and a moisture detector which electrically detects a variation in the amount of moisture to be absorbed by the moisture sensor depending upon the internal partial pressure of the water in the container due to the elastic deformation of the container.

9 Claims, 3 Drawing Figures

PRESSURE SENSOR

BACKGROUND OF THE INVENTION

1. Field of the Invention

This invention relates to a pressure sensor which detects a variation in the pressure in an atmosphere and/or liquid by the indication of an electrical output signal.

2. Description of the Prior Art

The measurement of pressure in an atmosphere or liquid has been carried out by mechanical variations of Bourdon's tubes, bellows, diaphragms, etc., which are popular therefor since they are inexpensive and not troublesome. However, the development of pressure sensors, which will be able to be adapted to an advanced electronic technology, thereby allowing for the measurement of a variation in the external pressure by the indication of an electrical output signal, is most desirable. Such pressure sensors can be connected to a data processing system, thereby attaining automatic measurement of pressure and automatic control of the sensors. Moreover, the use of an electrical output signal for the measurement of a pressure variation allows not only extremely precise detection of the pressure variation, but also rapid response. It also allows for the miniaturization of the size and the weight of the pressure sensors. Thus, a variety of pressure sensors have been developed, examples of which are as follows:

(1) A pressure sensor, which is composed of a metal diaphragm having a strain gauge of a metal foil, can detect a variation in the external pressure by the deformation of the diaphragm due to a variation in the pressure causing a strain of the metal foil resulting in a variation in the electrical resistance of the metal foil. This sensor in inferior in that it is less pressure-sensitive and can not be manufactured with a miniaturized size and weight, although it is superior in that it can be used under a high pressure and it has an excellent temperature characteristic which is stable for a long period.

(2) A Si diaphragm-type pressure sensor can detect a variation in the external pressure by the piezoresistance effect which results from a variation in the specific resistance of a Si crystal due to the application of pressure to the Si crystal. Although this sensor has advantages in that, since silicon is used as an element therefor, semiconductor technology can be applied thereto which allows mass production thereof and an incorporation with external circuits required therefor, the sensitivity depends greatly upon temperature and thus a circuit for the compensation of temperature is essential thereto. Although a pressure sensor incorporating both a temperature-compensating circuit and a Si diaphragmtype sensor onto the same Si-substrate has been proposed, it is expensive and, moreover, liable to breakage because of a lack of mechanical strength of the Si diaphragm.

(3) A presure sensor, containing piezoelectric elements made of polyvinylidenefluoride, zinc oxides, etc., therein, can detect a variation in the external pressure by the piezoelectric effect, which results from a strain of the piezoelectric elements due to the pressure to thereby produce an electromotive force. Although this sensor is excellent in that it can be small, lightweight and produce a high output power, it is greatly influenced by noise due to external vibrations.

(4) A pressure sensor using a quartz oscillator can detect a variation in the external pressure by utilizing a linear relationship between the oscillation frequency of the quartz and the pressure variation to be measured. This sensor is expensive and cannot be manufactured with a miniaturized size and weight.

(5) Other pressure sensors which detect a variation in the external pressure by a variation in the electrical capacitance based on a displacement of the diaphragm therein due to a variation in the pressure have been developed. These sensors are expensive and cannot be manufactured with a miniaturized size and weight.

(6) Other pressure sensors which detect a variation in the external pressure by a variation in the inductance based on the magnetiostrictive effect, which results from a stress of the magnet therein due to the pressure have been developed. These sensors are also expensive and cannot be manufactured with a miniaturized size and weight.

As mentioned above, pressure sensors which have been already developed are either inferior in characteristics or expensive, so that they cannot be put in practical use.

SUMMARY OF THE INVENTION

The pressure sensor of this invention which overcomes the above-discussed and numerous other disadvantages and deficiencies of the prior art, comprises an air-tight container, enclosing water vapor therein, which elastically deforms depending upon a variation in the external pressure to result in a variation in the content volume thereof, a moisture sensor disposed within said container, and a moisture detector which electrically detects a variation in the amount of moisture absorbed by said moisture sensor depending upon the internal partial pressure of water of said container due to the elastical deformation of said container.

At least a part of said air-tight container is, in a preferred embodiment, made of an elastic substance.

The air-tight container is, in a preferred embodiment, of a cylindrical shape, the top of which is made of an elastic substance.

The air-tight container is, in a preferred further embodiment, a bellows made of an elastic substance.

The moisture sensor is, in a preferred embodiment, a resistance-variation type moisture sensor, a capacitance-variation type moisture sensor or a ceramic moisture sensor.

The moisture sensor comprises, in a preferred embodiment, an insulating substrate, a moisture sensitive film formed on the substrate, a pair of combshaped electrodes formed on or under the moisture sensitive film, and lead wires, one end of each of which is connected to the comb-shaped electrodes and the other of each of which is connected to said moisture detector by connection terminals.

Thus, the invention described herein makes possible the objects of (1) providing a novel and useful pressure sensor in which a moisture sensor is utilized as a pressure detector thereby allowing simplification of the structure, resulting in the reduction of the production cost; and (2) providing a novel and useful pressure sensor in which an air-tight container attaining an elastic deformation depending upon a variation in the external pressure and a moisture sensor having electrical characteristics which vary depending upon the amount of water vapor absorbed thereby, are integrated into one body, so that it has a high pressure sensitivity and is mechanically strong. Moreover it can be manufactured to have the desired structure and characteristics.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The pressure sensor of this invention comprises an air-tight container enclosing water vapor therein, a moisture sensor disposed within the container and a moisture detector electrically detecting a variation in the amount of moisture absorbed by the moisture sensor depending upon the internal partial pressure of water the vapor in the container due to the elastic deformation of the container resulting from a variation in the external pressure. The container is at least partially made of an elastic substance which elastically deforms, due to a variation in the external pressure, resulting in a variation in the pressure of the water vapor enclosed in the container. Since the moisture sensor in the container has electrical characteristics (e.g., impedance, etc.), which vary depending upon the amount of water absorbed thereby, and the process of the water-absorption by the moisture sensor depending upon a variation in the pressure of the water vapor within the container is reversible, the variation in the amount of water to be absorbed by the moisture sensor can be exhibited as a variation in the electrical characteristics.

EXAMPLE 1

Figure 1:
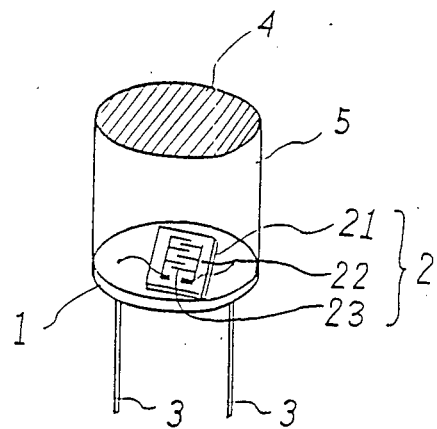
FIG. 1 is a diagrammatical perspective view showing a pressure sensor of this invention.

FIG. 1 shows a pressure sensor according to this invention, which comprises an air-tight container 10 and a moisture sensor 2 disposed within the container 10. The air-tight container 10 comprises a TO-8 stem 1, a cylindrical cap 5 disposed on the stem 1 to form an air-tight system therebetween, and an elastically deformable cover 4 made of a natural rubber, etc., which constitutes the top of the cylindrical cap 5. The moisture sensor 2 comprises an insulating substrate 21 made of alumina, etc., a moisture sensitive film 22 of a polyelectrolyte, such as sodium styrenesulfonate, etc., formed on the substrate, 21 and a pair of comb-shaped electrodes 23 formed on the moisture sensitive film 22. The comb-shaped electrodes 23 can be formed between the substrate 21 and the moisture sensitive film 22. Lead wires 31, which are bound to the pair of electrodes 23, respectively, are connected to a moisture detector (not shown) by connection terminals 3 and 3 which extend from the stem 1 to the outside.

The cap 5 is air-tightly placed on the stem 1 in an atmosphere of a relative humidity of 50% RH, resulting in an air-tight container 10 which encloses water vapor therein. The deformable cover 4 is made of an elastic substance having a 10 w gaseous permeability and an excellent flexibility, so that diffusion and/or permeation of gas neither from the inside to the outside nor from the outside to the inside of the airtight container 10 can arise, and thus the state where a certain amount of water vapor is enclosed in the container 10 and can be maintained. When the air-tight container enclosing a certain amount of water vapor therein is allowed to stand in an atmosphere or liquid, the cover 4 deforms in the direction of the outside or the inside of the air-tight container depending upon the atmospheric pressure or liquid pressure, resulting in a variation in the pressure of the water-vapor in the air-tight container, and thus the amount of water to be absorbed by the moisture sensor 2 in the air-tight container 10 varies. This results in a variation in the electrical characteristics of the moisture sensor 2, which is detected by a moisture detector (not shown) connected to the moisture sensor 2 by the connection terminals 3 and 3 to thereby determine the external pressure of an atmosphere or liquid surrounding the pressure sensor.

Figure 2:
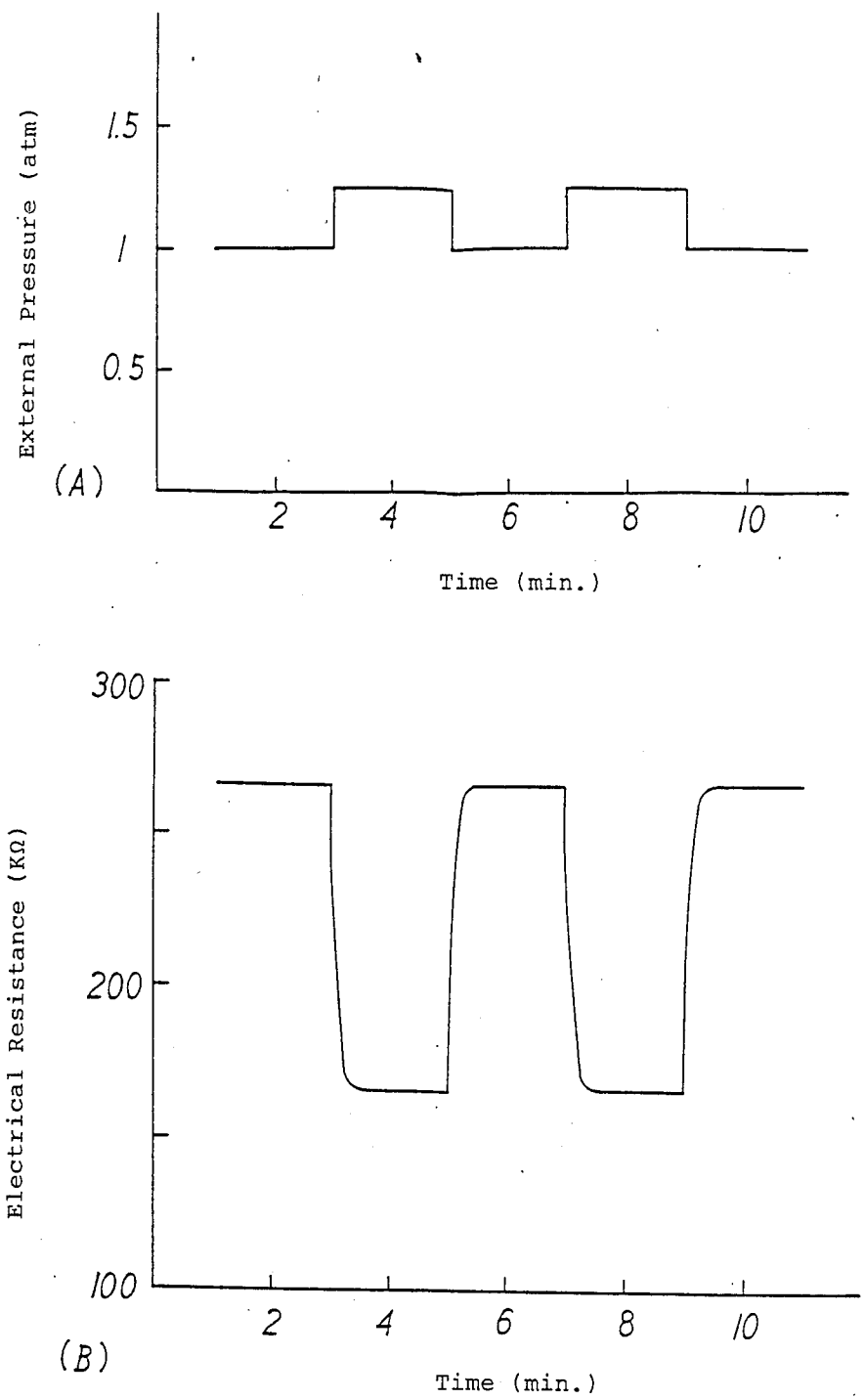
FIGS. 2(A) and 2(B), respectively, are characteristic curves showing the wave shape of an operation signal and the variation in resistance of the pressure sensor shown in FIG. 1.

The electrical resistance of the moisture sensor 2 of the pressure sensor having the above-mentioned structure was measured using the sine wave of an AC frequency of 1 KHz, the results of which is shown in FIGS. 2(A) and 2(B) indicating that when the pressure sensor was allowed to stand in an atmospheric pressure of 1.0 atm, the electrical resistance of the moisture sensor was 266 K$\Omega$ and when it was allowed to stand in a positive pressure of 1.25 atm, the electrical resistance was reduced to 165 K$\Omega$, that is, the electrical resistance of the moisture sensor decreases from 266 to 165 K$\Omega$ (i.e., by as much as approximately 100 K$\Omega$) as the pressure increases from 1.0 to 1.25 atm (i.e., by as small as 0.25 atm), and that contrary to the abovementioned, the electrical resistance increased when the pressure sensor was left in a negative pressure.

EXAMPLE 2

Figure 3:
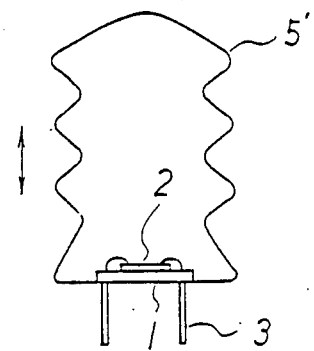
FIG. 3 is a diagrammatical front view showing another pressure sensor of this invention.

FIG. 3 shows another pressure sensor according this invention, wherein the cap 5' is composed of a bellows-shaped elastic cylinder made of polyethylene, nylon, plastics, etc., which elastically deforms in the direction of the arrows (shown in FIG. 3) due to the external pressure, resulting in a variation in the content value of the container. Since the air-tight container shown in FIG. 3 is of a bellows type, the entire container undergoes an elastic deformation by a pressure, so that the amount of displacement of the content volume depending upon a variation in the external pressure can be set to a large extent as compared with the air-tight container shown in FIG. 1.

Each of the above-mentioned pressure sensors can be also used as a detector for the determination of a remaining amount of solution by the detection of a pressure of the solution in a water tank containing the pressure sensor therein. Moreover, it can be incorporated into a data processing system to form an auto-controlling sensor.

The water vapor enclosed in the air-tight container is influenced by temperature. When such an influence is critical to the measurement of a pressure, a temperature-compensating sensor can be used together with the pressure sensor and the resulting difference in electrical resistance therebetween is subtracted from the electrical resistance of the pressure sensor to thereby determine the external pressure level. A temperature-compensating sensor can be designed in the same manner as the above-mentioned pressure sensor except that since the air-tight container has no elastically deformable part, it does not undergo elastic deformation due to a variation in the external pressure.

Although the moisture sensor 2 having a moisture sensitive film made of polyelectrolyte, etc., is only described in the above-mentioned examples, it is not limited thereto. Any moisture sensor, the electrical signal of which varies depending upon a variation in the moisture in an atmosphere can be used, other examples of which are a capacitance-variation type moisture sensor, a ceramic moisture sensor, etc. The shape of the air-tight container is not limited to a cylindrical shape, but a globular shape, a conical shape or other possible shapes can be used.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A pressure sensor comprising an air-tight container, having water vapor enclosed therein, which elastically deforms depending upon a variation in the external pressure to result in a variation in the content volume thereof, said container including a rigid base member and a further portion air-tightly connected to said base member and being at least partially elastically deformable in response to a variation of the external pressure; a moisture sensor disposed within said further portion of said container; and a moisture detector which electrically detects a variation in the amount of moisture to be absorbed by said moisture sensor depending upon the internal partial pressure of water vapor in said container due to the elastic deformation of said container.

2. A pressure sensor according to claim 1, wherein at least a part of said further portion of said air-tight container is made of an elastic substance.

3. A pressure sensor according to claim 2, wherein said further portion of said air-tight container has a cylindrical shape with a top closure which is made of an elastic substance.

4. A pressure sensor according to claim 1, wherein said further portion of said air-tight container is a bellows made of an elastic substance.

5. A pressure sensor according to claim 1, wherein said moisture sensor is a resistance-variation type moisture sensor, a capacitance-variation type moisture sensor or a ceramic moisture sensor.

6. A pressure sensor according to claim 1, wherein said moisture sensor comprises an insulating substrate, a moisture sensitive film formed on the substrate, a pair of comb-shaped electrodes formed on or under the moisture sensitive film, and lead wires, one end of each of which is connected to the comb-shaped electrodes and the other of each of which is connected to said moisture detector by connection terminals.

7. A pressure sensor comprising in combination: an air-tight container having water vapor contained therein, said container having a rigid base member and a further portion which is air-tightly connected to said base member and forms a wall of said container, said further portion being at least partially elastically deformable in response to a variation in the external pressure to cause a variation in the volume of said container; a moisture sensing element which is mounted on said base member within said further portion of said container and which has an electrical characteristic which varies in response to the partial pressure of the water vapor in said container; and a pair of electrical leads connected to said moisture sensing element and extending through said rigid base member of said container for connecting said moisture sensing element to an external detecting circuit.

8. A pressure sensor according to claim 7 wherein: said further portion of said container comprises a rigid cylindrical member which is sealed at one end by a flat cover portion formed of an elastically deformable material; and the other end of said cylindrical member is sealingly connected to said base member, which is likewise flat.

9. A pressure sensor according to claim 7 wherein said further portion comprises an elastically deformable bellows which is sealingly mounted on said base member.

* * * * *